United States Patent Office — 2,992,212, Patented July 11, 1961

2,992,212
PROPYLENE POLYMERIZATION
Edward H. De Butts, Wilmington, Del., assignor to Hercules Powder Company, Wilmington, Del., a corporation of Delaware
No Drawing. Filed Dec. 11, 1959, Ser. No. 858,849
1 Claim. (Cl. 260—93.7)

This invention relates to the polymerization of propylene to high melting crystalline polymer with a titanium catalyst.

It is now well known in the art to polymerize olefins with catalysts containing a combination of a titanium halide and an organoaluminum compound. It is also known to use a titanium halide in combination with an organoaluminum compound. However, neither the titanium halide alone nor the organoaluminum compound alone is an effective catalyst for the polymerization of propylene.

It has now been found that a catalyst prepared by combining titanium trichloride and dimethyl bis(cyclopentadienyl) titanium effectively polymerizes propylene to highly linear crystalline polymers of unusually high melting point.

The catalyst comprises two components; namely, titanium trichloride and dimethyl bis(cyclopentadienyl) titanium. The catalyst thus contains titanium as the sole metal component. Such a catalyst has been found to produce polypropylene having a much higher degree of linearity and crystallinity than is produced when the catalyst contains an alkyl aluminum compound as one of the components. Both X-ray data and melting points indicate that the polypropylene is produced in an unusually high yield of isotactic content. This unexpected result is characteristic of the all-titanium catalyst used in its preparation.

The titanium trichloride may be prepared by various methods such as by reaction of titanium tetrachloride with a reducing agent such as hydrogen or by thermal decomposition of an alkyl titanium trichloride. The titanium trichloride is insoluble in hyrdocarbon solvents and is preferably washed free of hydrocarbon-soluble materials formed in its preparation, particularly when prepared by the latter method. The titanium trichloride is used in finely divided state and may be crushed further if desired to obtain a material readily dispersible in hydrocarbon solvents.

The dimethyl bis(cyclopentadienyl) titanium is made by reaction of titanium tetrachloride with cyclopentadienyl sodium and lithium methyl in stepwise reaction. Thus, titanium tetrachloride on reaction with two moles cyclopentadienyl sodium will produce a bis-cyclopentadienyl) titanium dichloride, and this in turn on reaction with methyl lithium produces a methyl bis(cyclopentadienyl) titanium. Methods of preparing these compounds are known in "J. Inorg. and Nuclear Chemistry," 3, 108 (1956). While titanium chlorides are usually used in the above catalyst preparation, bromides or mixed chloride bromides are also useful.

The two catalyst components are usually dispersed in a hydrocarbon solvent for use in the polymerization system and they may be introduced together or separately. The ratio of the two components to each other for use in polymerization of propylene is not critical and may vary from a molecular ratio of titanium trichloride to dimethyl bis(cyclopentadienyl) titanium of about 1:0.25 to about 1:100, preferably 1:0.5 to 1:5, depending on the size of the titanium trichloride particles used. The two components appear to react with each other during the course of the polymerization and this appears to be largely a surface reaction in the case of the insoluble titanium trichloride.

The polymerization of propylene in accordance with this invention is carried out by mixing the catalyst components in the presence or absence of the propylene and then contacting the propylene with the catalyst. The propylene to be polymerized may be added in one batch or it may be added gradually and, if desired, more catalyst may be added gradually to the reaction mixture containing the propylene and both catalyst and propylene may advantageously be added gradually at the same time.

A solvent is not required for the polymerization reaction, but a small amount is preferable, and it may be any inert organic liquid, such as the aliphatic hydrocarbons, cyclic hydrocarbons, or aromatic hydrocarbons. Hexanes, heptanes, octanes, cyclopentanes, cyclohexanes, alkyl substituted cyclopentanes and alkyl substituted cyclohexanes, benzene, toluene, xylenes, and decahydronaphthalenes are examples of useful hydrocarbons. Halogenated aromatic hydrocarbons are also inert solvents which may be used. Examples of these are chlorobenzene, chlorotoluenes, chloroxylenes, and naphthyl chloride.

The polymerization reaction is generally carried out at a temperature in the range of about 0° C. to about 150° C., preferably in the range of 20–100° C. However, the polymerization is slowly operable from −50° C. and is rapidly operable at 175° C. In the latter case the time of reaction must be controlled by well-known engineering methods.

Pressure is not necessary for the reaction to take place. However, since the propylene is generally handled under pressure, it is general to carry out such polymerizations under pressure which may vary from atmospheric pressure to pressures up to liquefaction pressure of the propylene undergoing polymerization at the polymerization temperature. Pressures up to about 1000 lb./sq. in. are satisfactory.

The method of making and using the catalysts of this invention is illustrated by the following examples in which parts and percentages are by weight; the reduced specific viscosity (RSV) values are expressed as specfic viscosity of a 0.1% (weight/volume) solution of polymer in decahydronaphthalene at 135° C. divided by concentration; and melting points are microscopic birefringence melting points.

*Example 1*

A polymerization vessel containing a nitrogen atmosphere was charged with 34.2 parts heptane free of unsaturated impurities. To this was added 1.5 mmole $TiCl_3$ (violet prepared by hydrogen reduction of $TiCl_4$) and propylene was admitted under pressure. To this was added 0.8 mmole of dimethyl bis(cyclopentadienyl) titanium and the polymerization vessel was agitated at 24° C. until the pressure dropped to atmospheric pressure. The polymer was separated from the slurry, washed with a butanol-heptane mixture and finally with an ethanol-hydrochloric acid mixture and dried. The dry polymer amounted to 0.62 part. It melted at 173° C. and was shown by X-ray analysis to be highly linear (67% calculated crystallinity). The four intensity peaks characteristic of polypropylene were sharp and the fourth peak was sharply resolved as a doublet. By measurement of the breadth of the first three lines at half height, the widths of these lines were: 17 mm., 15½ mm. and 18 mm. as compared with widths of 26½ mm., 19 mm., and 22 mm., respectively, for the corresponding lines of polypropylene prepared using a catalyst made from $TiCl_4$ and ethylaluminum sesquichloride.

*Example 2*

A polymerization vessel containing an atmosphere of nitrogen was charged with 34.2 parts heptane free of unsaturated impurities. Then 0.321 part dimethyl bis(cyclopentadienyl) titanium and, subsequently, 0.1475 part titanium trichloride (prepared by thermal decomposition of ethyl titanium trichloride) were added. This mixture was agitated for one hour at about 25° C. to complete the formation of an active catalyst. The nitrogen atmosphere was removed by evacuation of the polymerization vessel, and propylene was added up to a pressure of 3.6 atmospheres. Polymerization was aided by stirring and the pressure dropped to 1.2 atmospheres during the first hour. Polymerization was continued for 16 hours, by which time the pressure had dropped to 0.4 atmosphere, and the slurry was no longer stirrable.

The polymer was separated from the slurry, washed with a butanol-heptane mixture and finally with an ethanol-hydrochloric acid mixture. The noncrystalline polymer was recovered from the combined heptane fractions and washes. It amounted to 0.25 part. The insoluble polymer amounting to 6.13 parts melted at 171° C., had an RSV of 15, and was highly linear and crystalline as shown by X-ray examination.

*Example 3*

The process of Example 2 was repeated using $TiCl_3$ prepared by hydrogen reduction of titanium tetrachloride. The yield was 7.22 parts crystalline polypropylene which melted at 169° C. and had an RSV of 24. There was also obtained noncrystalline polymer amounting to 0.4 part from the heptane. Thus 95° of the polypropylene produced was a crystalline fraction. Polypropylene produced by the same process using a catalyst prepared by mixing titanium tetrachloride and diethylaluminum chloride was only 88% crystalline.

*Example 4*

When Example 1 was repeated using a polymerization temperature of 60° C., the yield of polymer melting at 173° C. was 0.18 part.

The microscopic birefringence melting points were determined under exactly controlled conditions of melting a compressed wafer of polymer in a nitrogen atmosphere to disappearance of birefringence and cooling at 0.3% C./min. to room temperature to produce a relaxed, but crystalline sample. The sample was then heated on a microscope hot stage at 0.4° C./min. while observing through polarizing microscope for the temperature at which birefringence disappeared.

What I claim and desire to protect by Letters Patent is:

A process for the polymerization of propylene which comprises contacting propylene at a temperature of from about —50° C. to about 170° C. with the catalyst formed by mixing, in the presence of an inert organic liquid diluent, dimethyl bis(cyclopentadienyl) titanium with titanium trichloride in a molar ratio of from about 0.25:1 to about 100:1.

References Cited in the file of this patent
UNITED STATES PATENTS

| | | |
|---|---|---|
| 2,827,446 | Breslow | Mar. 18, 1958 |
| 2,917,501 | Drucker et al. | Dec. 15, 1959 |
| 2,924,594 | Breslow | Feb. 9, 1960 |

UNITED STATES PATENT OFFICE

CERTIFICATE OF CORRECTION

Patent No. 2,992,212            July 11, 1961

Edward H. De Butts

It is hereby certified that error appears in the above numbered patent requiring correction and that the said Letters Patent should read as corrected below.

Column 4, line 20, for "170° C." read -- 175° C. --.

Signed and sealed this 28th day of November 1961.

(SEAL)
Attest:

ERNEST W. SWIDER            DAVID L. LADD
Attesting Officer            Commissioner of Patents

USCOMM-DC